United States Patent [19]

Chow et al.

[11] 4,390,916
[45] Jun. 28, 1983

[54] SINGLE TRACK MAGNETIC HEAD ASSEMBLY

[75] Inventors: William W. Chow; Larry P. Dunn, both of Tucson, Ariz.

[73] Assignee: International Business Machines Corporation, Armonk, N.Y.

[21] Appl. No.: 208,766

[22] Filed: Nov. 20, 1980

[51] Int. Cl.³ .......................... G11B 5/42; G11B 5/20; G11B 5/221
[52] U.S. Cl. .................................. 360/127; 360/122; 360/123; 29/603
[58] Field of Search ............... 360/126, 127, 125, 123, 360/122; 29/603

[56] References Cited

U.S. PATENT DOCUMENTS 3,821,815 6/1974 Abbott et al. ...................... 360/113

FOREIGN PATENT DOCUMENTS 52-56916 5/1977 Japan ..................................... 29/603

OTHER PUBLICATIONS

Frost et al., "Fabrication . . . Head", IBM Tech. Disc. Bull., vol. 7, No. 11, Apr. 1965, p. 993.
IBM Technical Disclosure Bulletin, vol. 13, No. 5, Oct. 1970, p. 1323, G. R. Hasler, "Magnetic Head Having a Throat Height of Zero".

*Primary Examiner*—Robert S. Tupper
*Attorney, Agent, or Firm*—Nathan N. Kallman; Henry E. Otto, Jr.

[57] ABSTRACT

A single track magnetic head assembly comprises a nonmagnetic base, a magnetic layer disposed on one surface of said base, a nonmagnetic top closure positioned adjacent to an upper portion of said magnetic layer, and a magnetic bridge section positioned adjacent to the lower portion of said magnetic layer and below said top closure. A prewound coil is attached to the bridge section. The base, the magnetic layer and the top closure have arched sections to allow accurate definition of the throat height, and to enable testing of magnetic and physical properties of the magnetic head during the assembly process.

6 Claims, 22 Drawing Figures

SINGLE TRACK MAGNETIC HEAD ASSEMBLY

DESCRIPTION

Technical Field

This invention relates to a single track magnetic head assembly.

An object of this invention is to provide a novel magnetic head assembly having simple and relatively inexpensive construction.

Another object of the invention is to provide a magnetic head assembly which realizes a narrow data track width.

Another object is to provide a magnetic head assembly that allows easy control of throat height during manufacture.

Another object is to provide a magnetic head assembly that enables inspection and test of the magnetic and physical properties of the magnetic core during steps of manufacture and prior to final assembly.

A further object of this invention is to provide a magnetic head assembly that allows the use of a prewound coil and eliminates the need for window winding.

A still further object of this invention is to provide a magnetic head assembly that realizes uniformity of manufacture of mass produced magnetic heads.

BACKGROUND ART

Presently known ferrite core heads require precise machining and alignment and an undue number of processing steps during manufacture. Nevertheless, problems arise due to processing variability and off-specification construction that result in nonuniformity during mass production of the heads. These problems lead to losses due to "out-of-spec" heads, and poor signal performance during magnetic head operation.

Furthermore, when manufacturing ferrite heads with extremely small transducing gaps to achieve very narrow data track widths in order to increase track density, various difficulties are encountered with present day head designs and processes. In addition, it is not feasible during production to test magnetic heads made by current techniques for magnetic and other physical properties until the head assembly is completed. Therefore, although a component to be assembled with the head may not have the specified magnetic characteristics, it is not until the completed head assembly is tested that the defect can be detected.

BRIEF DESCRIPTION OF THE DRAWINGS

The invention will be described in detail with reference to the drawings in which.

Similar numerals refer to similar elements throughout the drawing.

DISCLOSURE OF THE INVENTION

Figure 1:
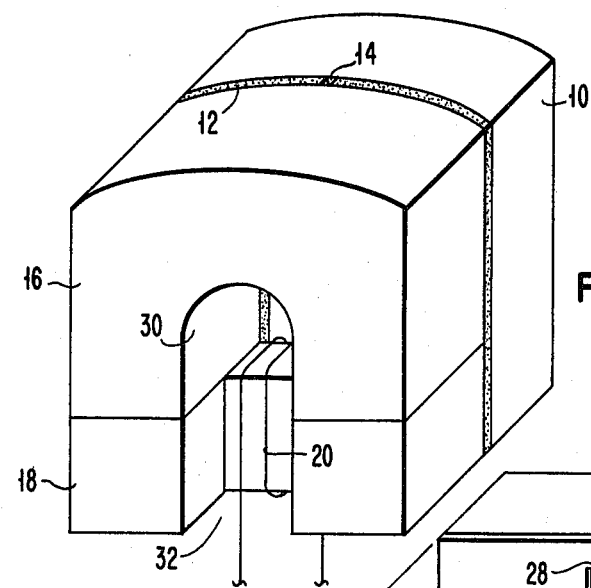
FIG. 1 is an isometric view of an assembled magnetic head assembly, made in accordance with this invention.

With reference to FIG. 1, a single track magnetic head assembly comprises a nonmagnetic base 10, and an epitaxial single crystal ferrite layer 12 deposited on a surface of the base 10. A transducing gap 14 is formed in the magnetic ferrite layer 12, by electron beam lithography, for example. The thickness of the ferrite layer 12 defines the track width of the magnetic head. A nonmagnetic top closure 16 is securely bonded to the top portion of the ferrite layer 12 and base 10, and a magnetic bridge 18 is joined to the ferrite layer 12 and base 10 at the bottom of the closure 16. The base and top closure may be made from silicon, sapphire, or manganese gallate, while the magnetic bridge may be made from manganese-zinc ferrite, or nickel-zinc ferrite, or Permalloy, by way of example. A prewound coil 20 for connection to signal circuitry is coupled to a center section 32 of the bridge 18.

Figure 2:
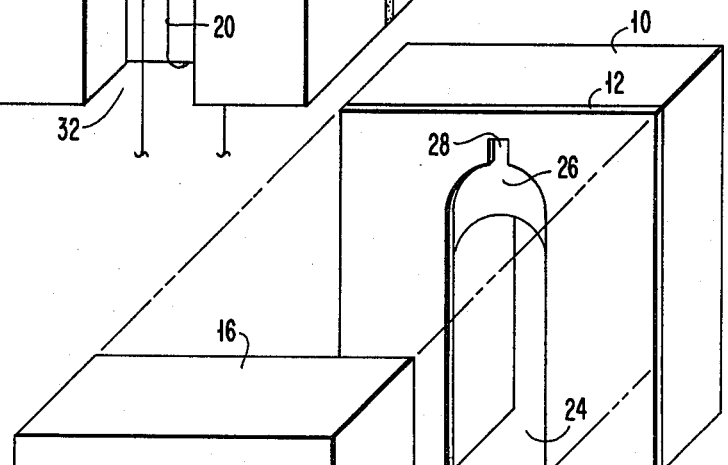
FIG. 2 is an exploded view of the magnetic assembly of FIG. 1, prior to lapping and contouring.
Figure 2:
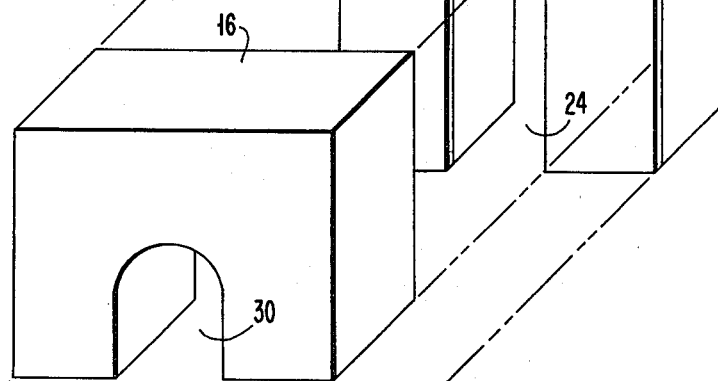
Figure 2:
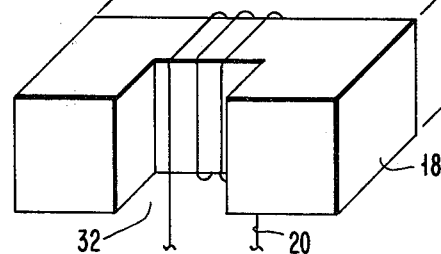

With reference to FIG. 2, the parts of the magnetic head assembly of FIG. 1 are illustrated prior to final assembly and prior to lapping and contouring. The base 10 is formed with an arched channel 24, and the ferrite layer 12 has an arched slot 26 having a span substantially of the same dimension as the arch of the channel 24, but being of greater height. At the top of the slot 26, there is a cutout 28 that is used in the throat height lapping operation.

The top closure 16 has an arched passage 30 that closely matches the shape of the upper portion of the arched channel 24. This passage 30 and a recessed section 32 in the magnetic bridge 18 provides space for the prewound coil 20, which is coupled to the bridge 18.

FIG. 3 illustrates the process steps employed in making a single track magnetic head assembly, in accordance with this invention. FIG. 3A depicts a substrate 34 that serves as the nonmagnetic base for the head assembly. The substrate is made from silicon or a nonmagnetic ceramic material, such as manganese gallate, by way of example. A layer of epitaxial single crystal ferrite 36 is deposited on the substrate, as in FIG. 3B, and an arched channel 24 is cut through the ferrite and substrate assembly, as in FIG. 3C. The ferrite layer, which serves as the magnetic core for the head, is further shaped by photolithography to define a higher arch 26 and a cutout 28, as in FIG. 3D.

Figure 3A:
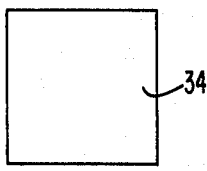
FIGS. 3A–I depict a series of steps performed during the manufacture of the magnetic head assembly.
Figure 3F:
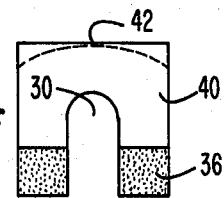
Figure 3B:
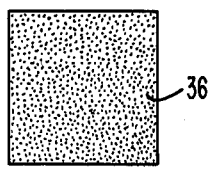
Figure 3G:
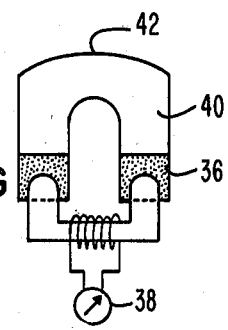
Figure 3C:
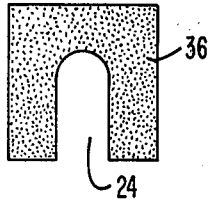
Figure 3H:
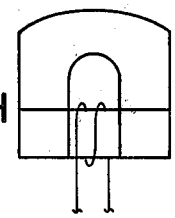
Figure 3D:
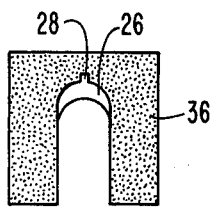
Figure 3I:
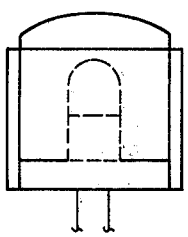
Figure 3E:
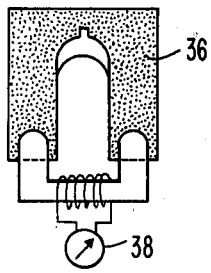

At this point, the magnetic properties of the ferrite core may be tested by means of an inductance measuring probe device 38, which is coupled to the ferrite layer, as in FIG. 3E. The test probe 38, which comprises a coil with a magnetic bar through the coil, bridges across the lower ends of the arch legs of the ferrite layer 36. Other tests and measurements may be made of the ferrite layer assembly prior to completion of the magnetic head. In this way, if the ferrite core does not meet the prescribed specifications, the assembly is not processed further.

As shown in FIG. 3F, a nonmagnetic top closure 40 is joined to the upper portion of the ferrite layer 36 and substrate 34. The closure arch 30 closely matches the upper portion of the arched slot 26 of the ferrite layer 36. The next step is the lapping of the transducing gap face 42 of the structure to a desired throat height, as represented in FIG. 3G, and more specifically, in FIGS. 4A–D.

Figure 4A:
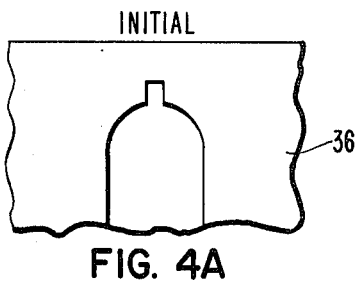
FIGS. 4A–D represent steps in the lapping operation that achieve the desired final throat height of the magnetic head assembly.
Figure 4E:
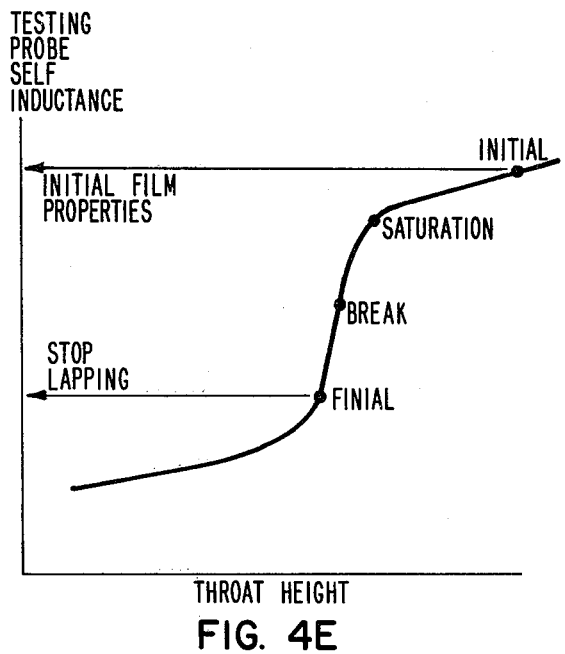
FIG. 4E is a curve related to the testing of the head assembly at each step.
Figure 4B:
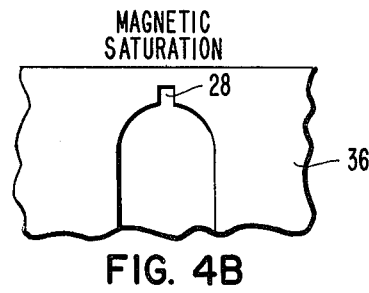
Figure 4C:
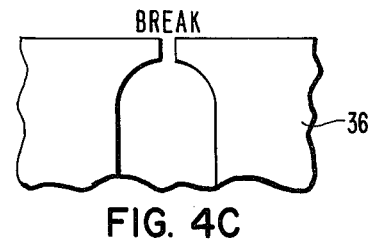
Figure 4D:
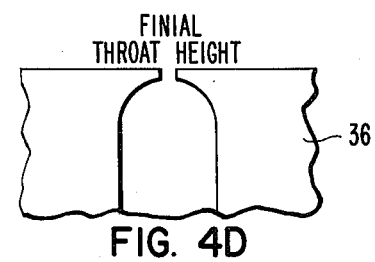
Figure 5A:
FIG. 5A is a top view of the magnetic head assembly of FIG. 1.
Figure 5B:
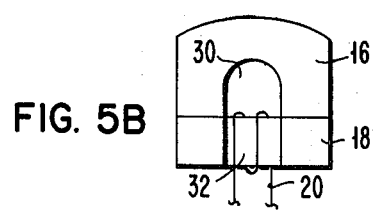
FIG. 5B is a front view of the magnetic head assembly.
Figure 5C:
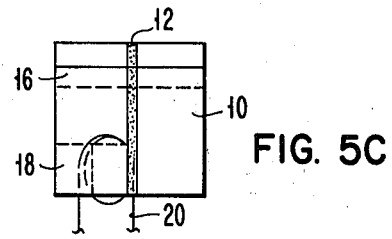
FIG. 5C is a side view of the magnetic head assembly.
Figure 5D:
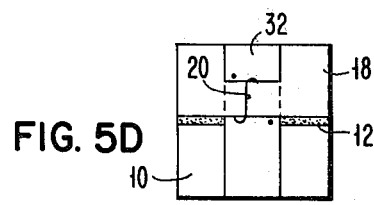
FIG. 5D is a bottom view of the magnetic head assembly.

With the test probe device 38 still connected, the head face is contoured and lapped. As the throat height is decreased, the reluctance of the magnetic circuit increases, and the self-inductance in the probe is decreased, as delineated in FIG. 4E. The lapping is completed when precise core reluctance is obtained. As an alternative, the electrical resistance of the magnetic ferrite layer may be measured. When the break in the cutout section 28 occurs, as shown in FIG. 4C, the resistance become infinite.

Following this invention, the assembly is monitored during the contouring and lapping processes by inductance measurements until the desired contour and throat height is reached, as in FIG. 3G. The magnetic bridge 18 and the prewound coil 20 are then secured to the assembly by epoxy adhesive, for example, as in FIG. 3H. Finally, as shown in FIG. 3I, the magnetic head assembly is installed in a nonmagnetic housing 44, which may be made of aluminum, that encompasses the head assembly to shield the head from spurious signals.

Figure 6B:
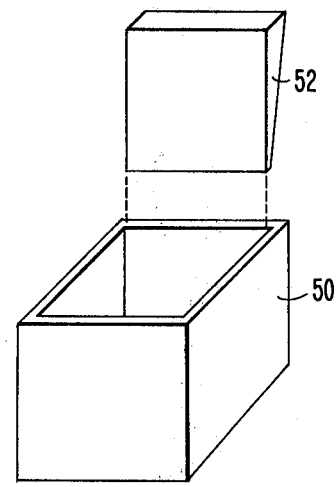
FIGS. 6A–B illustrate the types of housings that may accommodate the magnetic head assembly of FIG. 1.
Figure 6A:
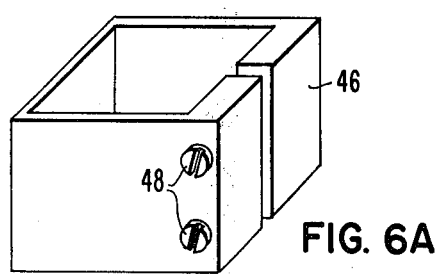

FIGS. 5A–5D illustrate respectively the top, front, side and bottom views of the head assembly without the housing. FIG. 6A shows one type of nonmagnetic housing 46 having screws 48 to secure the head assembly within the housing walls. FIG. 6B is another example of a housing 50 that employs a wedge 52 to hold the head assembly securely.

By virtue of the magnetic head configuration and the process used to achieve the design of this invention, the widths of the data tracks registered on a magnetic medium, such as a disk or tape, may be in the order of 1 micron. Inspection and test of the core can be accomplished before performing the expensive steps of contouring and attaching the electrical coil structure. Also, the need for the complex window winding of the electrical coil is eliminated. The prewound coil may be used for inductance measurements during the throat height lapping process.

It should be understood that the invention is not necessarily limited to the specific materials or exact geometrics designated supra. For example, the invention lends itself to foil-type cores, vacuum deposited Permalloy cores, as well as epitaxial single crystal ferrite cores. Also, rectangular slots and channels may be employed instead of the arched geometrics. With this invention, no back gap is formed, thus adding to head efficiency. A significant feature of this invention is the realization of uniformity of the head cores made in accordance with the design and process of this invention.

What is claimed is:

1. A magnetic head assembly comprising:
    a nonmagnetic substrate having a slot extending upwardly from one edge;
    a thin film layer of magnetic material deposited on a flat surface of said substrate generally normal to said edge, said thin film layer having a slot contiguous with the first-mentioned slot and of greater height as measured from said edge, terminating in a transducing gap which is of substantially narrower width than said slots and extends to a transducing face defining the upper end of the assembly and has a height corresponding to a preselected desired throat height;
    a nonmagnetic closure joined to said thin film layer and extending downward from said transducing face part way toward said edge, said closure having a slot substantially aligned with and substantially the same width as the upper portion of said first-mentioned slot;
    a magnetic bridge structure joined to said thin film layer and extending from the bottom of said closure to said edge, said bridge structure having a U-shaped recess aligned with said slots and extending laterally inward part way toward said thin film layer;
    said thin film layer separating said substrate from said closure and bridge structure and making planar contact with said bridge structure and being bisected by the slot and gap therein to form two substantially symmetrical pole pieces; and
    electric coil means disposed within said recess and wound about said bridge structure.

2. A magnetic head assembly as in claim 1, wherein said thin film layer is formed from epitaxial single crystal ferrite.

3. A magnetic head assembly as in claim 1, wherein said nonmagnetic substrate and said closure are made from silicon, or sapphire, or manganese gallate.

4. A magnetic head assembly as in claim 1, wherein said transducing face is arcuately contoured.

5. A magnetic head assembly as in claim 1, wherein the thickness of said thin film layer defines the width of data tracks registered on a magnetic medium by said magnetic head assembly.

6. A magnetic head assembly as in claim 1, including a nonmagnetic housing for securing said head assembly.

* * * * *